US012704152B2

(12) United States Patent
Mitsch

(10) Patent No.: US 12,704,152 B2
(45) Date of Patent: Aug. 11, 2026

(54) CARDANICALLY FLEXIBLE COUPLING FOR TRANSMITTING HIGH AXIAL FORCES FOR DRIVE TRAINS IN WIND TURBINES

(71) Applicant: FM Energie GmbH & Co.KG, Heppenheim (DE)

(72) Inventor: Franz Mitsch, Heppenheim (DE)

(73) Assignee: FM Energie GmbH & Co.KG, Heppenheim (DE)

( * ) Notice: Subject to any disclaimer, the term of this patent is extended or adjusted under 35 U.S.C. 154(b) by 341 days.

(21) Appl. No.: 18/264,643

(22) PCT Filed: Feb. 7, 2022

(86) PCT No.: PCT/EP2022/025044

§ 371 (c)(1),
(2) Date: Aug. 8, 2023

(87) PCT Pub. No.: WO2022/171363

PCT Pub. Date: Aug. 18, 2022

(65) Prior Publication Data

US 2024/0110601 A1 Apr. 4, 2024

(30) Foreign Application Priority Data

Feb. 9, 2021 (EP) .................................... 21020063

(51) Int. Cl.
*F16D 3/06* (2006.01)
*F16D 3/12* (2006.01)
*F16D 3/80* (2006.01)

(52) U.S. Cl.
CPC ................ *F16D 3/06* (2013.01); *F16D 3/12* (2013.01); *F16D 3/80* (2013.01); *Y02E 10/72* (2013.01)

(58) Field of Classification Search
CPC ..... F16D 3/06; F16D 3/12; F16D 3/80; Y02E 10/72
(Continued)

(56) References Cited

U.S. PATENT DOCUMENTS 3,726,108 A * 4/1973 Geislinger ................ F16D 3/60 464/24
4,619,627 A * 10/1986 Balken ...................... F16D 3/80 464/24
(Continued)

FOREIGN PATENT DOCUMENTS

EP 1 593 867 A1 11/2005
EP 2 895 768 B1 7/2015
(Continued)

OTHER PUBLICATIONS

International Search Report Corresponding to PCT/EP2022/025044 mailed May 17, 2022.

*Primary Examiner* — Greg Binda
(74) *Attorney, Agent, or Firm* — Secant IP, P.L.L.C.

(57) ABSTRACT

Machine components which are intended preferably for drive trains for driven installations and have the function of a cardanically flexible coupling with simultaneously high torsional stiffness, and are capable of absorbing high forces acting axially on the installation. The particular functionality of these couplings is achieved in particular through the use of specially equipped and oriented hydraulic springs. Drive trains for wind turbines, which are equipped with a corresponding coupling, in order to divert and distribute in particular high axial forces.

12 Claims, 8 Drawing Sheets

(58) Field of Classification Search
USPC ............................................... 464/28; 290/52
See application file for complete search history.

(56) References Cited

U.S. PATENT DOCUMENTS

| | | | |
|---|---|---|---|
| 8,991,800 | B2 | 3/2015 | Mitsch |
| 2015/0226186 | A1 | 8/2015 | Mitsch et al. |

FOREIGN PATENT DOCUMENTS

| | | | |
|---|---|---|---|
| EP | 3 012 478 | A1 | 4/2016 |
| EP | 3012479 | A1 | 4/2016 |
| WO | 2010/054808 | A1 | 5/2010 |
| WO | 2012/057808 | A1 | 4/2012 |

* cited by examiner (a)

(b)

(a)

(b)

(c)

CARDANICALLY FLEXIBLE COUPLING FOR TRANSMITTING HIGH AXIAL FORCES FOR DRIVE TRAINS IN WIND TURBINES

This application claims the benefit under 35 U.S.C. § 371 as a U.S. National Phase Application of application no. PCT/EP2022/025044, filed on 7 Feb. 2022, which claims benefit of European Patent Application no. 21020063.0 filed 15 Mar. 2022, the contents of which are hereby incorporated herein by reference in their entireties.

FIELD OF THE INVENTION

The invention relates to a machine component which is preferably provided for drive trains for driven installations and has the function of a cardanically flexible coupling with simultaneous high torsional rigidity, and is capable of absorbing high forces acting axially on the turbine. It is therefore possible to relieve other parts of the installation. The particular functionality of these couplings is achieved in particular by the use of specially equipped and oriented hydraulic springs.

The invention relates in particular to drive trains for wind turbines which are equipped with a corresponding coupling according to the invention in order to distribute, in particular, the high axial forces which act along the rotor shaft and on the rotor bearing, to other machine parts in such a way that, in turn, other machine parts, such as the transmission, remain as force-free as possible.

In systems with driven components, such as wind turbines, forces also occur which are undesirable and can damage or destroy components. These can be related to the application or also inherent to the system.

In particular in wind turbines, loads caused by the influence of the wind also occur in addition to conventional machine driving forces. Considerable tensile, compressive and transverse forces in the main shaft, main bearing, machine frame and drive train can be initiated by sometimes strongly irregular wind strengths or directions, or by other special events. Such constraining forces in the drive train of an installation can lead to severe damage to bearings and also power-conducting parts of the drive train of a wind turbine.

In order to avoid this or to minimize the loads, elastic couplings for transmitting torques, for example from the rotor or the transmission, are frequently used in the prior art. According to the prior art, couplings which have elastic bushings arranged in a circular manner on the circumference of the coupling disks are an option to counteract the problem. Couplings with elastic bushings axially aligned with the drive train are much more rigid in the radial direction than in the axial direction (factor of 10 to 100). This means that in the case of high torsional rigidity, they also have a low cardanic rigidity, which is generally desired. However, such elastic bushings are also not very rigid in the axial direction, so they can only transmit small axial forces. Such pure bushing couplings are less suitable for the drive train of an installation which has to transmit high axial forces, such as in particular in the case of a wind turbine.

Various solutions are described in the prior art for this purpose. EP 1 593 867 B1 describes a coupling which is formed by bracing two mutually opposite conical elements. In this double-cone bearing, the force is transmitted in the axial direction from the transmission flange to the mainframe via the two diametrically braced conical bearings, which are cantilevered and braced by cone pieces. WO 2010/054808 describes a machine/transmission bearing for transmitting axially and radially occurring forces and torques, which comprises an axially aligned elastomeric sandwich element and an elastomeric cone element attached above or below it, the axis of which is oriented perpendicular to the sandwich element and whose tapered end is positioned relative to said sandwich element, wherein the two parts are connected to one another by a second conical element and a cylinder piece, and each of the elements has a central axially aligned bore for receiving clamping means.

The greater axial rigidity achieved therewith naturally also results in greater cardanic rigidity, which is not really desired for certain applications. Moreover, the solutions of the cited prior art are at their limit when there are very high axial forces, as occur in particular in today's very large wind turbines. Moreover, they require a relatively large amount of space and are therefore less suitable in such installations in which this is a problem.

SUMMARY OF THE INVENTION

It was therefore an object of the invention to provide a coupling device or a bearing device acting in this regard for a drive train, in particular a wind turbine, which in addition to high axial and torsional rigidity simultaneously also has a low cardanic rigidity.

The object was achieved by a coupling and/or bearing device which provides a combination of an arrangement consisting of axially aligned, radially rigid spring elements (e.g. elastic bushings) having an arrangement of axially arranged or axially effective elastic hydraulic elements.

The subject matter of the invention is therefore a coupling for transmitting torques and high axial forces with high torsional and low cardanic rigidity, comprising a first machine component on which a force and/or a torque introduced from the outside acts, and a second fixed machine component to which the force and/or the torque is transmitted from the machine component.

In this case, the two machine components are rotationally symmetrical with respect to an imaginary common axis and have a central bore for receiving a shaft, via which the introduction of force, for example from the rotor thrust of a wind turbine, takes place.

Said machine components are connected to one another by spring elements, wherein the spring elements can be equipped in a variety of ways and can be arranged in a variety of ways in order to transmit and absorb differently directed forces of different strength.

It is essential to the invention that the described couplings now have, in addition to the described spring elements that are normal per se, elastic hydraulic springs which are braced by means of suitable fastening means with the first and second machine components.

According to the invention, said machine components therefore have a plurality of first hydraulic springs which are arranged and functionally connected at least to the first machine component using connecting and clamping means such that an axial tensile force can be exerted or transmitted to the first machine component with respect to the second stationary machine component.

According to the invention, said machine components also have a plurality of second hydraulic springs which are arranged and functionally connected at least to the second machine component such that an axial compressive force can be exerted or transmitted to the first machine component with respect to the second stationary machine component.

The machine components of the coupling according to the invention are preferably formed by two rotationally symmetrical disks or flange pieces which are arranged opposite one another and are braced against one another, wherein one of the machine components is fixedly connected to a suitable support structure of the installation.

Preferably, the disks or flanges have a central bore for receiving a rotatable continuous or flanged shaft. This shaft forms the axis of the coupling, and axial, radial and torsional forces occurs, which are transmitted to the coupling part according to the invention, are introduced via this shaft.

A bushing coupling is provided in one embodiment of the invention. In this case, the disks or flange pieces preferably have a plurality of axial bores or recesses for functionally receiving a plurality of elastic bushings. The bores are preferably distributed uniformly on the circumference. The elastic bushings are accommodated in either one of the two disk-shaped machine components and have press contact with the second opposite machine component by means of connecting and clamping means. In a preferred embodiment of the invention, a correspondingly dimensioned disk with an increased frictional resistance can be provided in this case to increase the contact surface between the bushing and the machine component.

In a more elaborate embodiment, a preferably cylindrical end piece of the elastic bushings is accommodated in continuous bores of the first disk-shaped machine component, and the other cylindrical or conical end piece of the bushings is tightly recessed into a cylindrical or conical bore or depression in the second opposite machine component that is braced with the first.

The elastic, preferably round bushings, which are therefore oriented parallel to the axis of the coupling or bearing and are designed in such a way that they have a radial rigidity which is at least 10 times, preferably at least 100 times that of the axial rigidity, are, for example, composed of alternating parallel, preferably cylindrical layers made of rubber/elastomer and metal/sheet metal about a cylindrical solid inner core, as are known per se in the prior art. The bushings can also have conical end pieces with which they project into the bores of the disk-shaped machine components.

In another embodiment of the invention, said machine components (disks) can also be designed as a packet coupling, as are described in the prior art. In this case, the circumferential spring elements are not present as elastic bushings, but rather in the form of elastic layer spring elements, while the machine components are designed as star-shaped disks. The two disks are interlinked via cams on the star-shaped arms between which said elastic layer spring elements are arranged.

In addition to said spring elements distributed on the circumference of the machine components (e.g. elastic bushings or the layer springs of packet couplings), the couplings according to the invention comprise two, three, four, five, six or more pairs of first hydraulic springs and second hydraulic springs which can be arranged at, on or between the disk-shaped machine components.

According to the invention, the first hydraulic springs of each pair are arranged in such a way and are functionally connected at least to the first machine component by connecting and clamping means such that they can exert or transmit an axial tensile force on the first machine component with respect to the second machine component. In contrast, the second hydraulic springs are arranged according to the invention and are functionally connected at least to the machine component by connecting and clamping means such that they can exert or transmit an axial compressive force to the disk-shaped machine component with respect to the machine component.

The first and second hydraulic springs according to the invention are fastened and braced using corresponding bores in the first and/or second machine component.

In the case of a bushing coupling, bores for the fastening means of the elastic bushings can advantageously also be used. In this case, a hydraulic spring or a pair of hydraulic springs is ideally positioned between two adjacent bushings on one of the two machine components and braced with the other machine component via the bores of said adjacent bushings.

In principle, however, other arrangements and fastenings are also possible provided they are suitable for the functional task of the hydraulic springs. Thus, separate bores can also be provided in one of the two or in both machine components in addition to the bores for the elastic bushings for the clamping/bracing of the hydraulic spring elements. It is also possible to use hydraulic springs of different sizes and therefore of different effectiveness in terms of their tensile/compressive force.

It is possible in principle to attach the hydraulic springs to a disk or flange or to distribute them on both disks or flanges or between them. Furthermore, a single pair of pressure and tension hydraulic springs can be formed from hydraulic springs arranged next to one another or one above the other or separately.

The hydraulic springs are therefore arranged in such a way that they act in the axial direction, that is to say in the direction of the shaft, wherein a part of the hydraulic springs is oriented in such a way that they ensure a pressure or tension load in the axial direction, and the other part of the hydraulic springs ensures a pressure or tension relief in the axial direction. As a rule, the same number of pairs of hydraulic springs are provided for the load and the relief.

The hydraulic springs according to the invention, like the circumferential spring elements of the bushing or packet coupling that usually have a smaller radius, are preferably uniformly distributed on the circumference of the disk-shaped machine components, wherein at least two hydraulic springs are to be provided for applying pressure-tension, and at least two hydraulic springs for relieving pressure-tension. Two pairs of hydraulic springs can cause an asymmetrical cardanic rigidity, but this may be desirable under certain circumstances. Preferably, three pairs of hydraulic springs are provided. Of course, more than three (pairs of) hydraulic springs, i.e., also four, five, six or more, can also be used if necessary. Even just two pairs of hydraulic springs, which are preferably arranged opposite each other, can already provide the desired damping characteristics of the coupling.

The hydraulic springs of the axial load are connected to one another via hydraulic lines or hoses, as well as the hydraulic springs which are responsible for the relief in the axial direction. Hydraulic operation leads to frictional forces in the lines and additionally causes damping of the system, in particular in the pitch and yaw direction of wind turbines. Due to the arrangement of the connecting hoses, the system consisting of the axial hydraulic elements is only rigid in the axial direction. By contrast, it can be easily deformed in the cardanic direction.

The hydraulic springs consist substantially of layer spring elements which are constructed from elastic layers and inflexible metal layers and can be hydraulically pressed or relaxed. In order to guarantee the corresponding effectiveness in the axial direction, the surfaces of the layer spring elements must be arranged at a 90° angle to the coupling axis or to the shaft of the coupling, that is to say perpendicular thereto.

Forces that can be transmitted, for example initiated via the shaft or along the axis, act on the coupling component when under load, which forces are tensile forces or compressive forces depending on the main direction of the force. Since the elastic bushings in this arrangement have a low axial rigidity, the system connected to the coupling also has a low cardanic rigidity with respect to the direction of the axis, i.e. is still able to move well cardanically.

In general, the number of hydraulic elements as well as the number of other spring elements can be adapted to the overall size and the intended torques. Thus, according to the invention, at least two (pairs of) hydraulic springs and eight to 32 spring elements (e. g. elastic bushings) can be provided. If necessary, it is possible to use four, five, six or more such pairs of hydraulic springs. Furthermore, for specific requirements it is also conceivable to distribute pairs of hydraulic springs unevenly on the disks, or to use the unequal numbers of hydraulic springs for load and relief.

In the embodiments of the invention explained below, for example, 24 elastomer bushes are arranged on the circumference of the disks. As a result, the cardanic restoring torque can be kept small according to the invention. Preferably, the hydraulic springs are placed on the fixed component (for example, mainframe) for good accessibility.

According to the invention, the acting forces, including the torque, are transmitted from the first machine component to the fixed second machine component. As already mentioned elsewhere, the first hydraulic spring serves to transmit tensile forces from the first machine component to the second stationary machine component, wherein the compressive force is transmitted via connecting and clamping elements to the first machine component. By contrast, the compressive forces are transmitted via the second hydraulic elements from the first machine component to the stationary component by means of other connecting and clamping elements.

As already stated, the described first and second hydraulic springs are also particularly suitable for use in packet couplings. The shaft of such a packet coupling is therefore able to transmit axial, radial forces as well as drive torques.

The couplings according to the invention can be used rotating around their axis or stationary.

The subject matter of the invention is also a drive train for a wind turbine which is equipped with a rotor shaft, a rotor bearing, a transmission bearing, a transmission housing and a mainframe, wherein the drive train, which connects the rotor to the transmission via the rotor shaft, has a coupling or flange arrangement as described.

In one embodiment of the invention, the coupling or flange arrangement is arranged in the region of the transmission bearing. It can be provided that the first preferably disk-shaped machine component is connected to the transmission housing, and the second preferably disk-shaped machine component is connected to the mainframe.

By means of such an arrangement or a similar arrangement according to the invention, it is possible, for example, for the rotor bearing of a wind turbine to be largely freed of axial forces and for it only to have to absorb radial forces. The sometimes considerable axial forces, which are introduced via the rotor and the rotor blades, in particular under extreme conditions, can now be transferred via the coupling arrangement according to the invention to other stable regions, for example to the machine carrier or to the transmission housing, and absorbed there.

The object of the invention is ultimately also a wind turbine which comprises a coupling, a flange or a bearing or as part of a drive train, as described above and in the claims.

BRIEF DESCRIPTION OF THE DRAWINGS

The invention is explained in more detail below with reference to the attached figures.

DETAIL DESCRIPTION OF THE PREFERRED EMBODIMENT(S)

Figure 1:
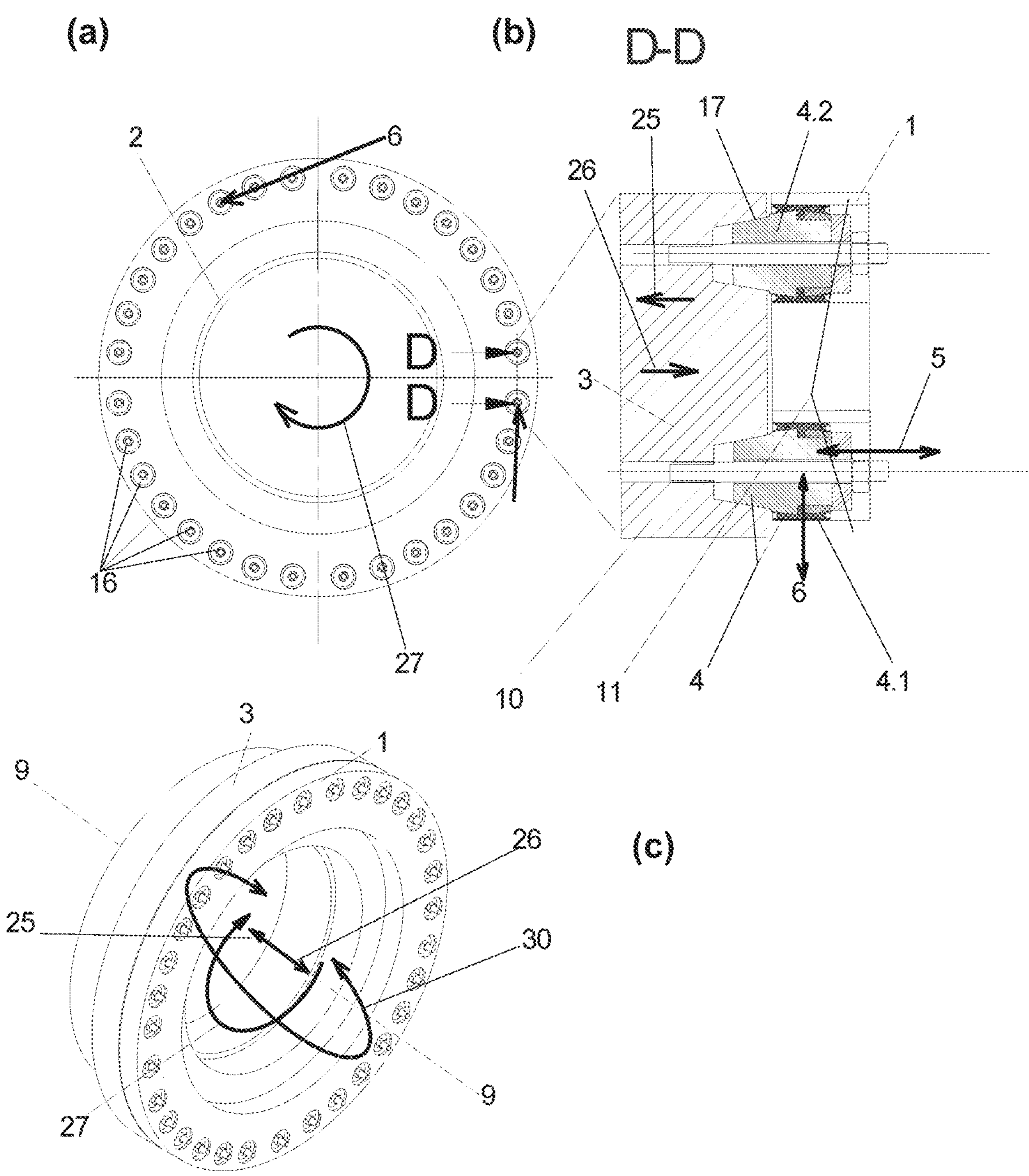
FIGS. 1(*a*)-(*c*) show different views of a typical bushing coupling of the prior art, with FIG. 1(*b*) being a cross-sectional view along section line D-D of FIG. 1(*a*), FIGS. 2(*a*)-(*d*) show various views of a first embodiment according to the present invention, with FIG. 2(*b*) being an enlarged cross-sectional view along section line D-D of FIG. 2(*a*) and FIG. 2(*d*) being an enlarged view of the indicated area of detail shown in FIG. 2(*c*), FIGS. 3(*a*)-(*b*) show two 3D views of the coupling according to the invention in the embodiment of FIGS. 2(*a*)-(*d*), FIGS. 4(*a*)-(*f*) shows different views and details of another embodiment of the invention, with FIG. 4(*b*) being a cross-sectional view along section line A-A of FIG. 4(*a*), FIGS. 5(*a*)-(*d*) show various views and details of an arrangement of a coupling according to the invention in a wind turbine, with FIG. 5(*c*) being a cross-sectional view along section line C-C of FIG. 5(*b*) and FIG. 5(*d*) being a cross-sectional view along section line E-E of FIG. 5(*b*), FIGS. 6(*a*1)-(*b*2) shows two adjacent bushings which connect disks/flanges of the embodiment of FIGS. 2(*a*)-(*d*), with FIG. 6(*a*2) being a cross-sectional view along section line D-D of FIG. 6(*a*1), FIGS. 7(*a*)-(*c*) show a use of hydraulic springs according to the invention in a typical packet coupling of the prior art, with FIG. 7(*c*) being a cross-sectional view along section line D-D of FIG. 7(*b*)

FIGS. 1(*a*)-(*c*) show a typical bushing coupling of the prior art in different views. A first disk (2) is connected to a second disk (3) via a plurality of bushings (4) distributed uniformly on the circumference. For this purpose, axially aligned bores are provided both in the round plate (2) and in the round plate (3). The parts are braced against each other with clamping means, for example screw connections. The disks (2) (3) have a common axis (9) through their center point. A circular opening for receiving a shaft (22) (not shown) is provided through this center point along the axis. A torque (27) can be exerted via the shaft (22).

The bushings (4) are therefore likewise distributed radially about the center point, but are arranged axially with respect to the axis (9). The shown bushings consist of a fixed inner part (4.2) and an elastic outer part (4.1) surrounding it. The elastic part can also consist of alternating layers of elastomer and metal, as has already been described in the prior art.

In the shown example, the disk (3) serves to introduce force while the disk (2) absorbs the force. An axial force (5) and a radial force (6) are exerted on the bushings (4) under load/tension. As already mentioned, significantly larger forces can be transmitted and absorbed in the radial direction than in the axial direction by this common bushing geometry and arrangement (approximately a factor of 10 to 100).

Moreover, in the perspective view of FIG. 1(*c*), the forces acting overall are represented by arrows. In this case, (25) (26) axial forces (acting outwardly and inwardly), (27) correspond to the torque and (30) correspond to the cardanic acting force, FIGS. 2(*a*)-(*d*) shows a first embodiment according to the present invention, again in various views.

Figure 2:
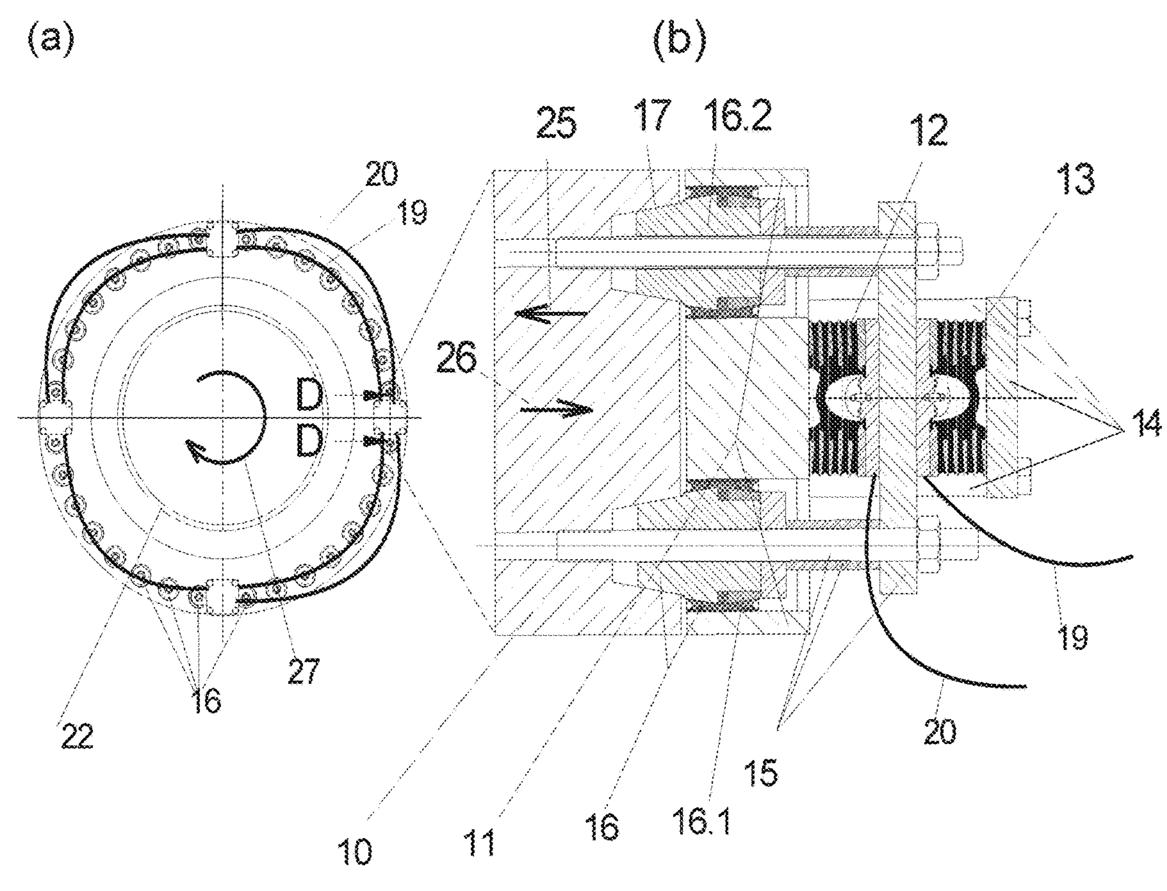
Figure 2:
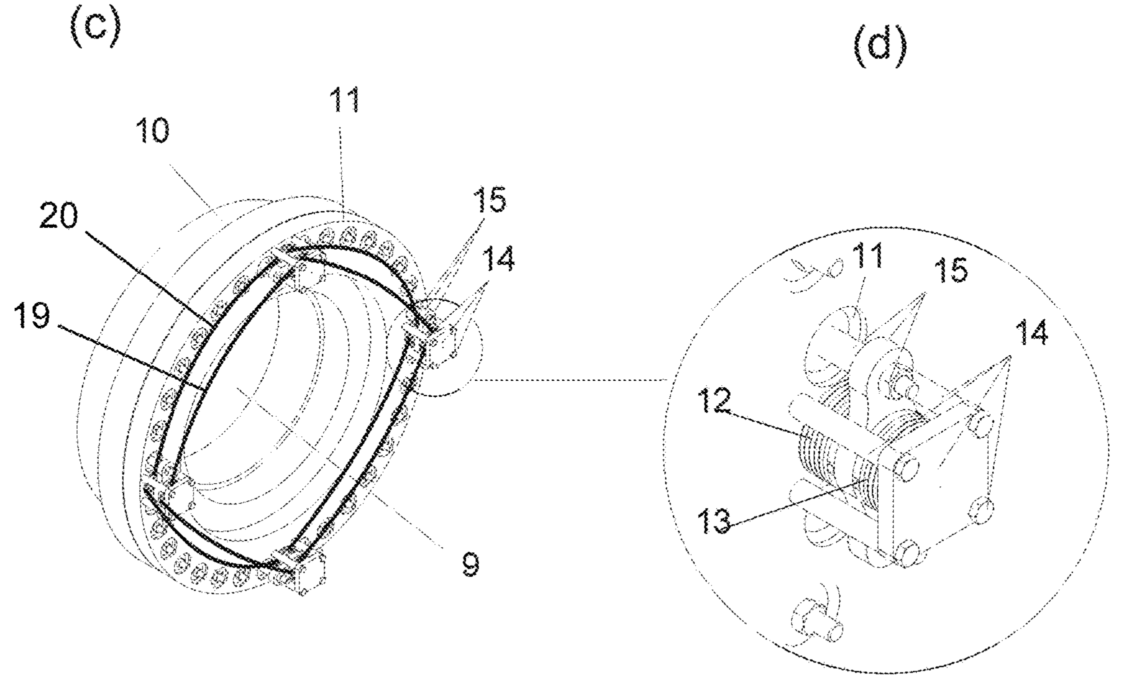

FIG. 2(*a*) represents a plan view of the front coupling disk (11). This corresponds in structure to the coupling disk (2) from FIGS. 1(*a*)-(*c*).

Numerous bushings (16) are attached to the circumference of the component parallel to the axis (9). The bushings correspond in structure to those of FIGS. 1(*a*)-(*c*), and therefore consist of a fixed inner part (16.2) and an elastic outer part (16.1) surrounding said inner part. A shaft (22), onto which a torque (27) can be exerted, is guided through the center of the coupling disks.

According to the invention, hydraulic springs (12) (13), arranged one above the other in the shown instance, are attached at four positions, top and bottom, left and right, of the coupling disk (11).

FIG. 2(*b*) shows as a detail in an enlarged cross-sectional side view the design and arrangement according to the invention of two hydraulic springs (12) (13) which are mounted one above the other as a pair. In the example shown, the arrangement is selected such that the hydraulic spring (12) exerts a tensile force (26) with respect to the disk (10) and therefore ensures relief relative to the disk (11). Conversely, the hydraulic spring (13) ensures a compressive force (25) on the disk (10), thereby causing a load to be applied to the disk (11). It can be seen from the embodiment shown that the hydraulic spring (12) is braced with the disk (10) via said bores by connecting and clamping means (15) which are also used by two adjacent elastic bushings (16), while the hydraulic spring (13) is fastened to the fixed disk (11) by means of its own connecting and clamping means (14). The hydraulic pressure is regulated via a hydraulic pressure line (19) which is connected to the hydraulic spring (13), and a hydraulic line (20) which is connected to the hydraulic spring (12).

The detail of FIG. 2(*b*) further shows two adjacent elastic bushings (16) which use the same clamping means as the hydraulic springs (12) arranged between them. In this embodiment, the bushings (16) have a fixed core (16.2) which is mounted or pressed by its one tapered end into a correspondingly shaped depression (17) in the coupling disk (10). The bushings (16) are connected via their elastic layer (16.1) to the coupling disk (11).

FIG. 2(*c*) shows a view of the embodiment according to FIGS. 2(*a*) and 2(*b*) taking into account the arrangement and connections of the hydraulic lines (19) and (20). In this case, all four hydraulic springs (13) are connected to one another by hydraulic lines (19), and all four hydraulic springs (12) are pressure-connected to one another by hydraulic lines (20).

FIG. 2(*d*) show additional details of the embodiment according to the invention described here. In particular, the enlarged detail of FIG. 2(*b*) clearly shows how the two hydraulic springs (12) and (13) are connected to the coupling disks (10) and (11) in this embodiment.

Figure 3:
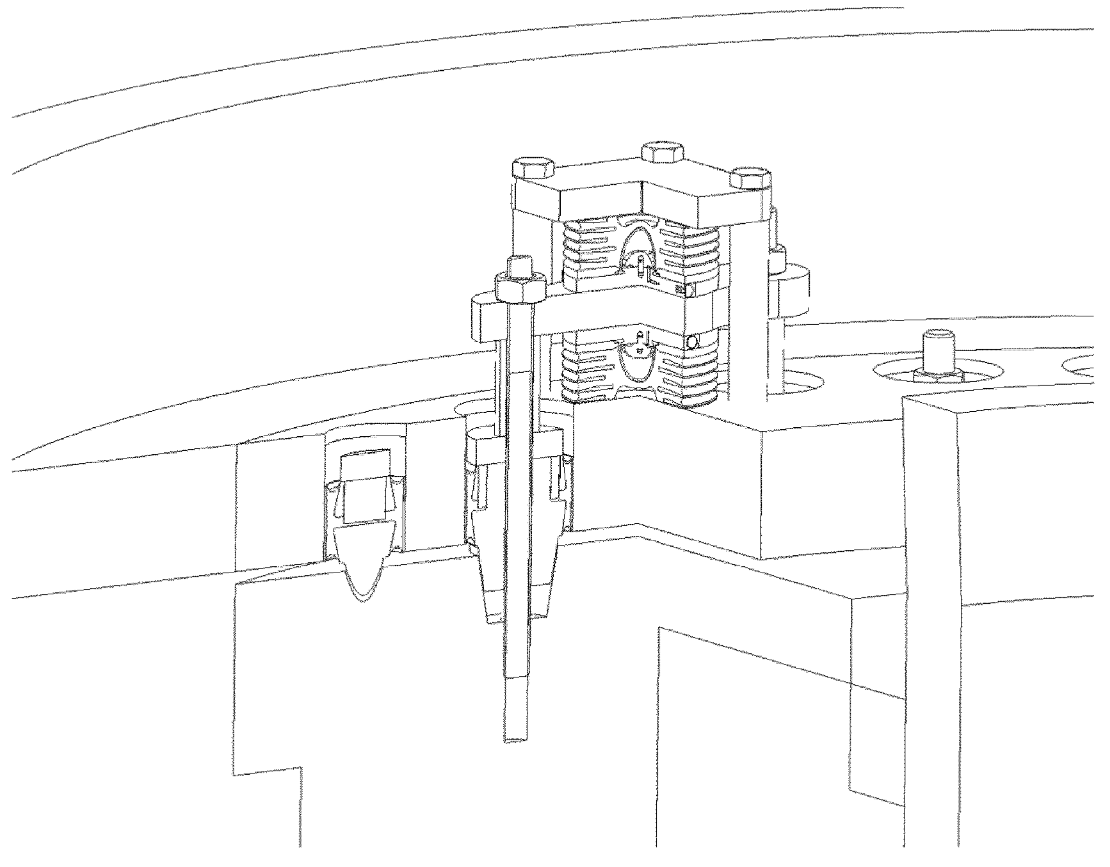
Figure 3:
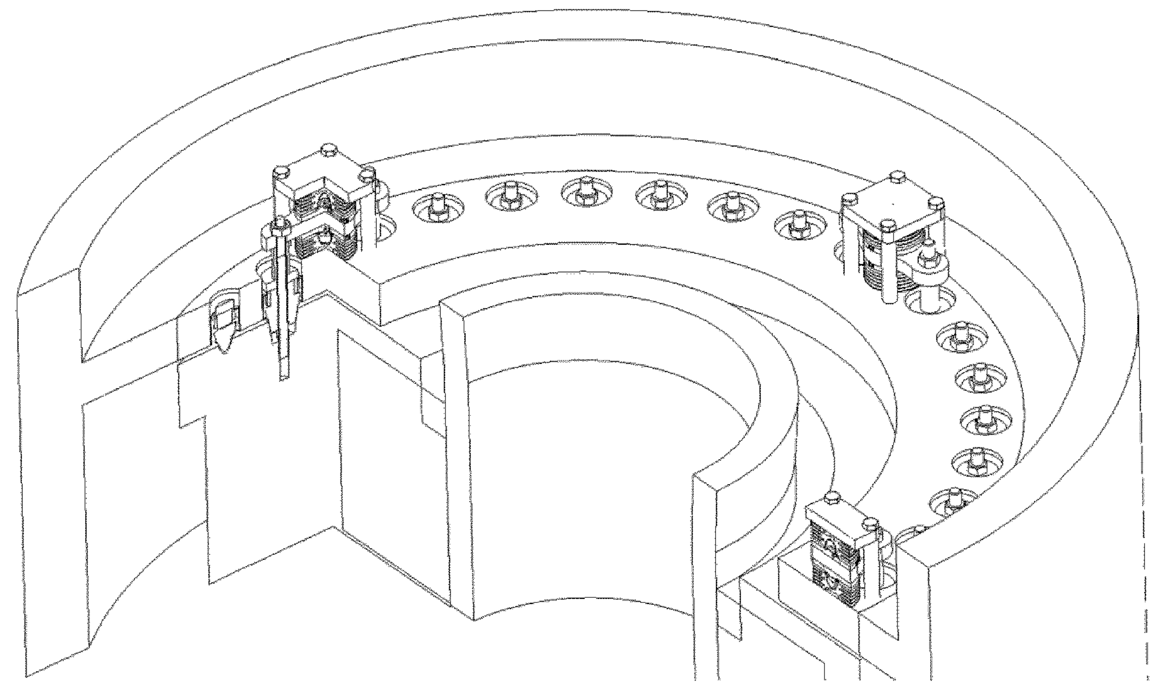

FIGS. 3(*a*)-(*b*) shows two 3D views of the coupling according to the invention in the embodiment of FIGS. 2(*a*)-(*d*).

FIG. 3(*a*) shows an enlarged detail of that part of the coupling which corresponds to FIG. 2(*b*) (now rotated by) 90°. The upper hydraulic spring (13) is fastened by its connecting and clamping means (14) directly to the disk (11). It is mounted on a cover plate which, together with the hydraulic spring (12) arranged underneath, is braced with the disk (10) arranged under the disk (11) by means of two clamping screws (15). According to the invention, the clamping screws hydraulic spring (12) are guided here according to the invention through bores in two adjacent elastic bushings (16) and are screwed to the underlying disk (10). The elastic bushings (16) themselves are embedded in precisely fitting cylindrical bores of the upper coupling disk (11). With their lower end, which is longer than the thickness of the disk (11), the bushings, in this case with a conical end piece, are also tightly borne in correspondingly shaped depressions or openings in the lower disk (10). This structure is not only practical with respect to accessibility but also saves space and materials. Moreover, it is functionally extremely effective.

FIG. 3(*b*) shows a 3D section of the entire coupling of the described embodiment. The upper disk (11) is fixedly connected to a support structure designed as a tube here. The disk comprises a plurality of elastic bushings (16) which, as described, are countersunk into corresponding bores in the disk (11). A total of four pairs (only three shown) of hydraulic springs (12) and (13) arranged one above the other are attached 90° apart, as described above. The disk-shaped component (10) within the support structure can also be seen as well as the shaft (2), or the guide thereof, which ultimately introduces and transmits the axial force.

Figure 4:
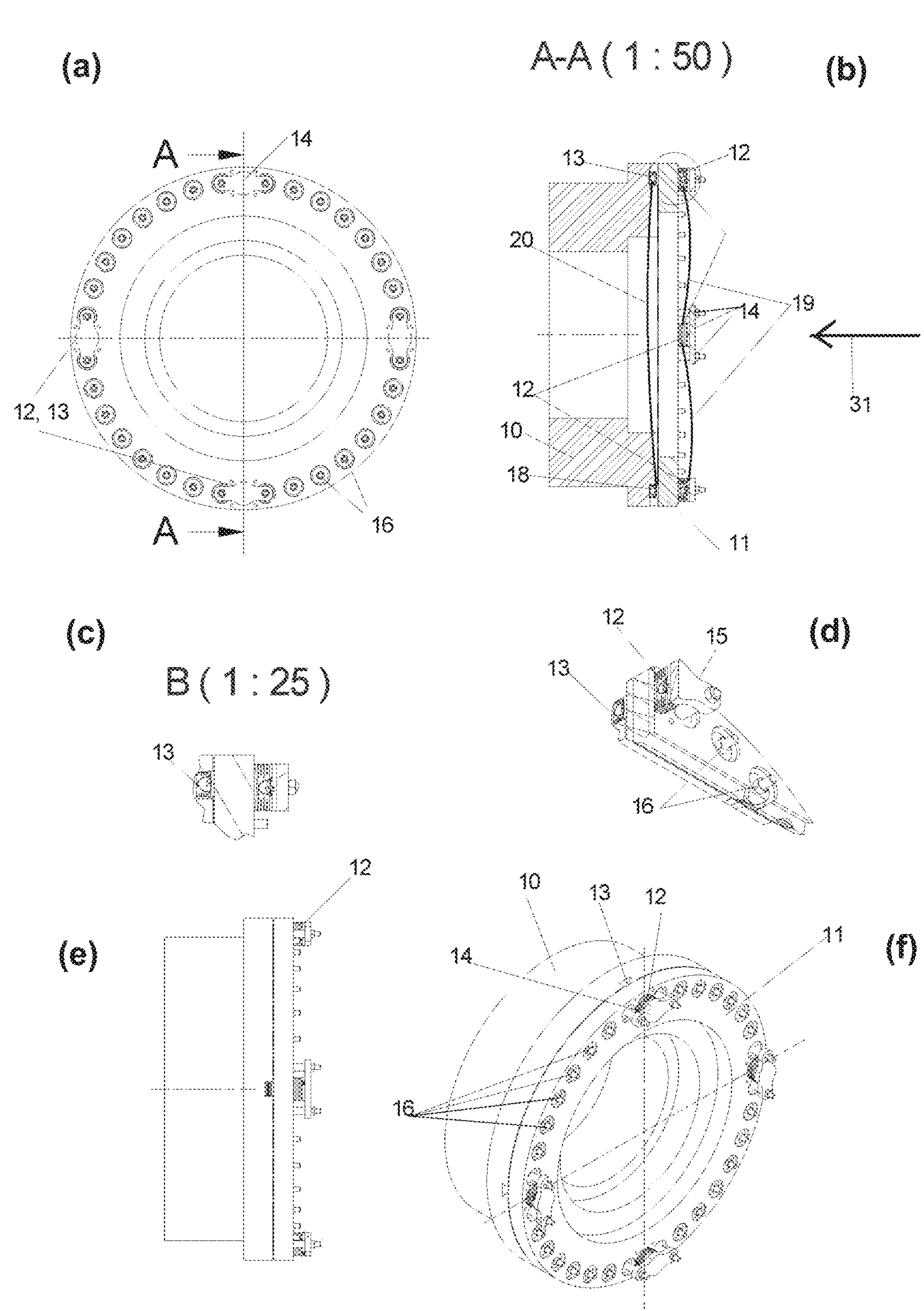

FIGS. 4(*a*)-(*f*) show different views and details of another embodiment of the invention, in which a total of four pairs of hydraulic springs (12) and (13) are provided as shown in FIG. 4A (left upper image). Here, the hydraulic springs (12) are provided by means of separate connecting and clamping elements. Alternatively, the clamping elements can also be guided through separate bores which are not identical to the clamping elements for the elastic bushings.

Furthermore, in this embodiment, the hydraulic springs (13), which are responsible for relieving the load on the system, are selected to be significantly smaller, whereby smaller axial forces are absorbed. This is advantageous for cases where the tensile forces (26) are smaller than the compressive forces (25). In addition, in the example shown, in contrast to the embodiment of FIGS. 2(*a*)-(*d*), these smaller hydraulic springs (13) are arranged between the coupling disk (11) and the coupling disk (10), while the hydraulic springs (12) responsible for the load are attached to the outer side of the coupling disk (11).

If the hydraulic springs (13) only have to transmit very small axial forces, they can in principle also be replaced by conventional elements without a hydraulic function.

In the upper right image (FIG. 4(*b*)), which shows a section along section line A-A of FIG. 4(*a*)) of the coupling according to the invention, the arrow (31) indicates the direction of the introductory force for this example, for example by the rotor thrust of a wind turbine.

Figure 5:
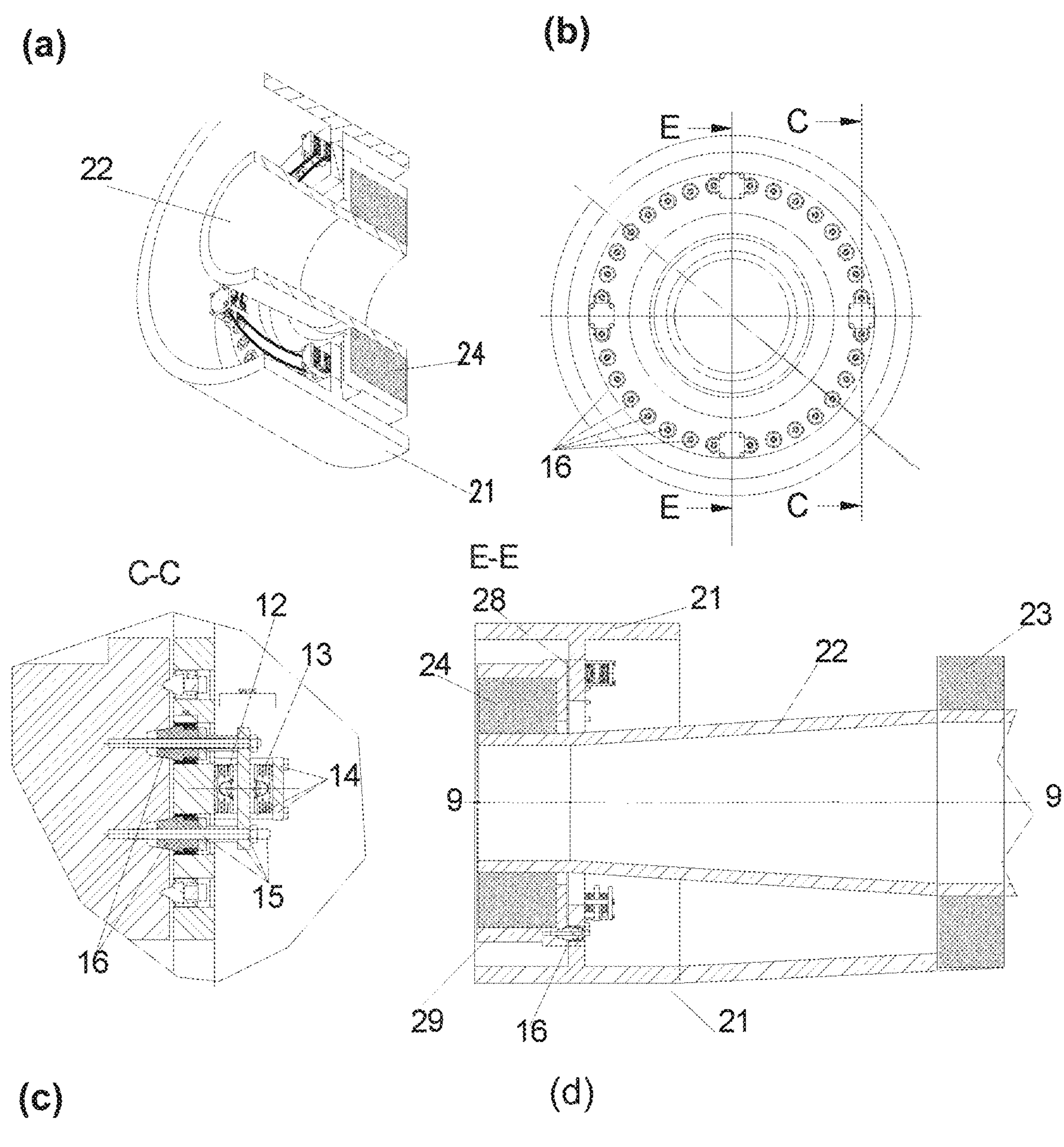

FIGS. 5(*a*)-(*d*) show various views and details of an arrangement of a coupling according to the invention in a wind turbine, as has already been described in more detail in FIGS. 2(*a*)-(*d*) and 3(*a*)-(*b*).

The rotor bearing (23) outlined here (see FIG. 5(*d*)) is designed such that it can transmit only radial forces. In this example, the rotor shaft (22) is axially free and transmits the axially effective forces generated by the rotor thrust via a transmission input bearing (24) to the fixed component (11), which in turn is connected to the mainframe (21). Thus, the transmission is therefore axially held on the mainframe (21)

via the hydraulic elements (12) and (13) described above. The angular movements caused by machine bending (vertical and horizontal displacement of the components (23) to (24)) can be transmitted to the mainframe (21) by means of relatively small restoring forces via a transmission housing (29), wherein a movement in the gap (28) takes place. The transmission housing (29) corresponds to the machine component (10), and the mainframe (21) corresponds to the fixed machine component (11) of FIGS. 2(*a*)-4(*f*).

It can be seen from this example that the axial forces which are initiated by the rotor need not be taken over by the rotor bearing (23), or only to a small extent, but are ultimately distributed on the rear components (10) (11) (29) and (21). This leads to the conservation of material and safer operation.

Figure 6:
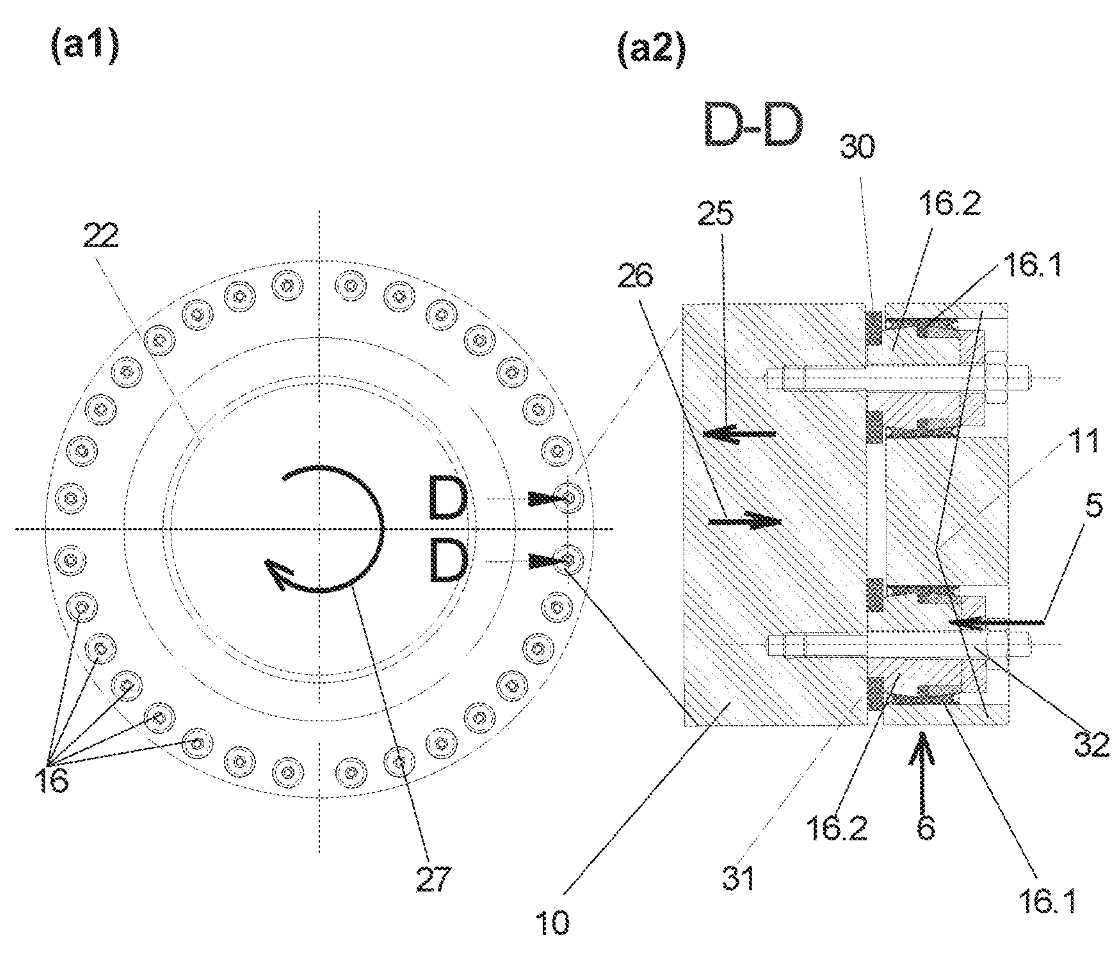
Figure 6:
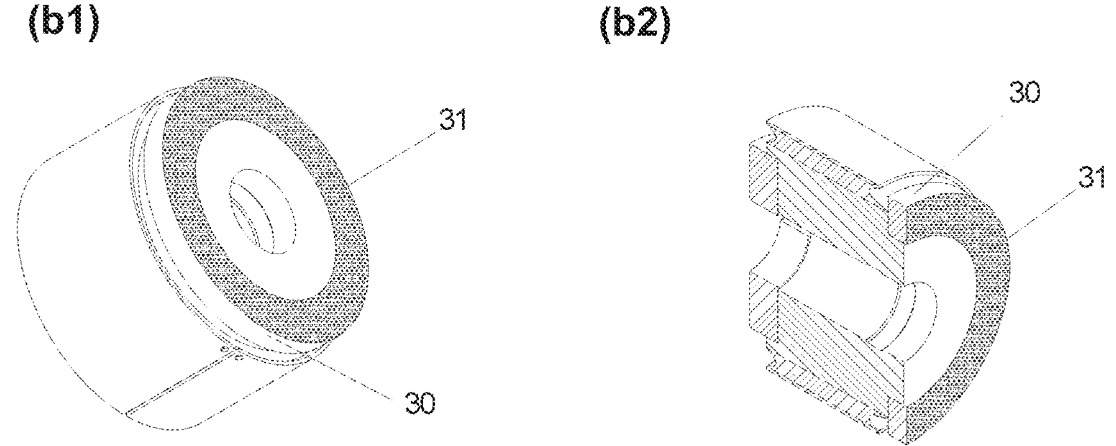

FIGS. 6(*a*1), (*a*2), (*b*1), (*b*2). The image on the right in FIG. 6(*a*2) shows an enlarged cross section of two adjacent bushings (16) which connect the disks/flanges (10) (11) of the embodiment of FIGS. 2(*a*)-(*d*) to one another (image on the left). The hydraulic springs according to the invention have been omitted here for better clarity.

The conical shape of the bushing ends from FIG. 2(*b*) and the corresponding recess in the machine parts has been replaced by a cylindrical shape of the bushings. The disk (11) has a corresponding cylindrical bore, while the disk (10) no longer has a bore for fixing the bushings (16). The connection between the machine parts (10) (11) is carried out by means of the clamping elements (32) solely by means of friction contact.

Since, under load, a plurality of differently directed forces act in the region between the machine part (10) and the bushings (16), it is expedient to provide a correspondingly dimensioned disk (30) between the bushing (16), which is mounted directly on the machine part (10), in order to transmit a sufficiently high surface pressure due to the increase in surface area achieved thereby.

In one particular embodiment, the disk (30) has a surface, preferably coated on one side, which significantly increases the friction, whereby significantly higher forces can be transmitted (FIG. 6(*b*1), 6(*b*2)). By way of example, the disk surface can have a layer of diamond dust. The non-coated side of the disk (30) can be held on the flange by a pin, for example.

Figure 7:
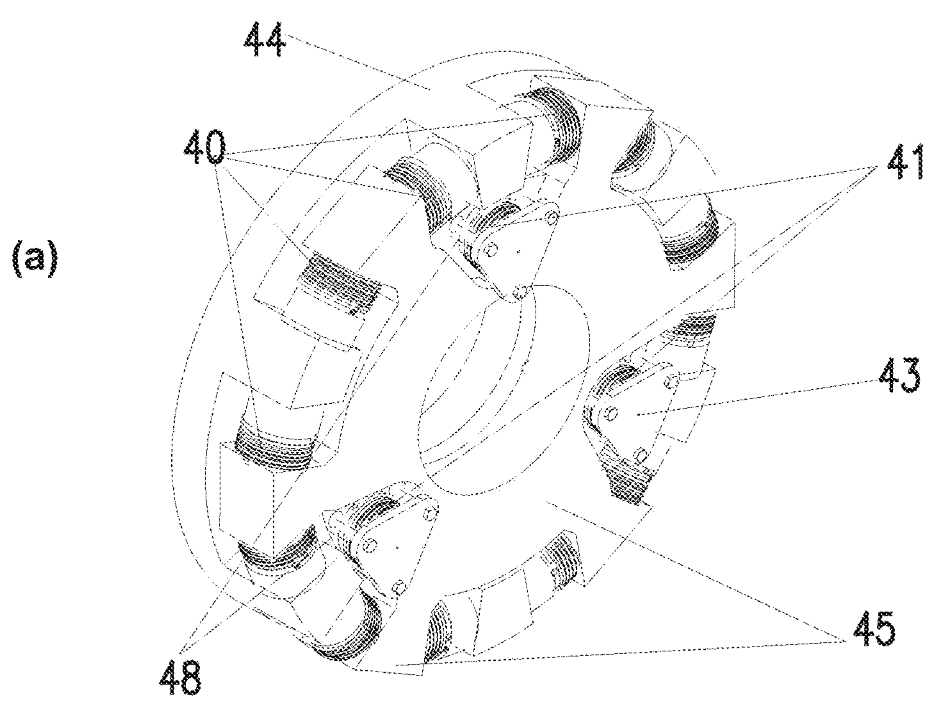
Figure 7:
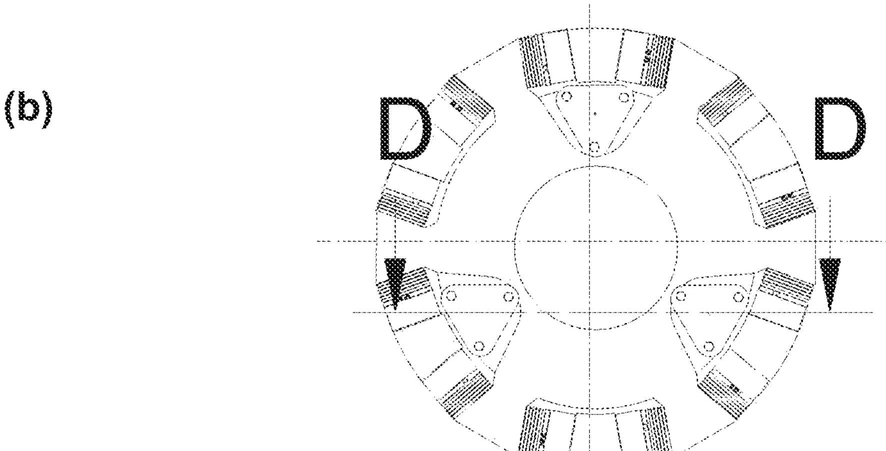
Figure 7:
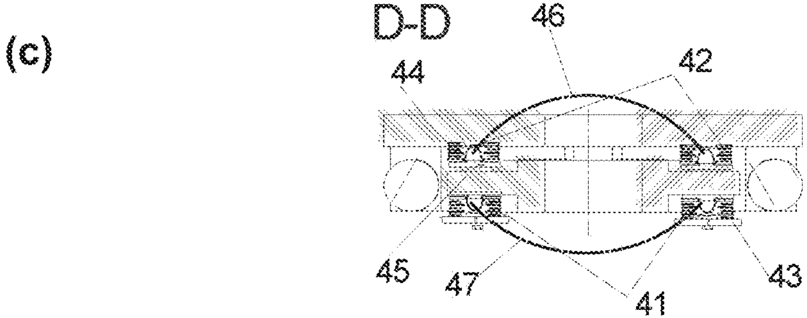

FIGS. 7(*a*)-(*c*) and 8(*a*)-(*b*) show the use of the hydraulic springs according to the invention in a typical packet coupling of the prior art. Accordingly, a packet coupling equipped in this way is likewise subject matter of the invention.

The shown packet coupling comprises an input spider (44) and an output spider (45) as coupling disks, as well as pairs of elastomer elements (40) which are arranged between the cams of the two components. These elastic elements are therefore oriented tangentially to the transmission of the corresponding forces.

Between the coupling disks (44) and (45), two, three or more (in the example: three) pairs of hydraulic elastomer elements (41) (42) arranged one above the other, which correspond to the elements (12) (13) of the preceding embodiments, are now distributed uniformly over the circumference in the axial direction. These elastic elements mounted in the direction of the axis (9) are pretensioned by a yoke (43) and the bolts (48) such that the two coupling disks (44) (45) are braced against each other. In this case, all hydraulic elastomer elements (42) facing the drive side (44) are connected to hydraulic lines (46), while the hydraulic elastomer elements (41) arranged outside the output spider (45) are connected to hydraulic lines (47).

In the shown embodiment, the hydraulic elastomer element (42) is positioned between the input spider (44) and the output spider (45), while the element (41) is arranged on the outer side of the output spider (45). As already described above for the bushing coupling, it is also possible to attach both elements (41) (42) differently, for example outside the coupling disks or also next to one another instead of one above the other.

FIGS. 7(*a*)-(*c*) show such a packet coupling in perspective view (FIG. 7(*a*)), in plan view (FIG. 7(*b*)) and in cross section (FIG. 7(*c*)). In total, six pairs of tangentially arranged elastomer elements (40) are attached uniformly to the circumference of the input spider (44). Three pairs of axially arranged hydraulic elastomer elements (41) (42) are likewise distributed uniformly on a smaller radius, wherein the elements (42) between the coupling disks and the elements (41) on the outside of the output spider (45) are arranged one above the other.

Figure 8:
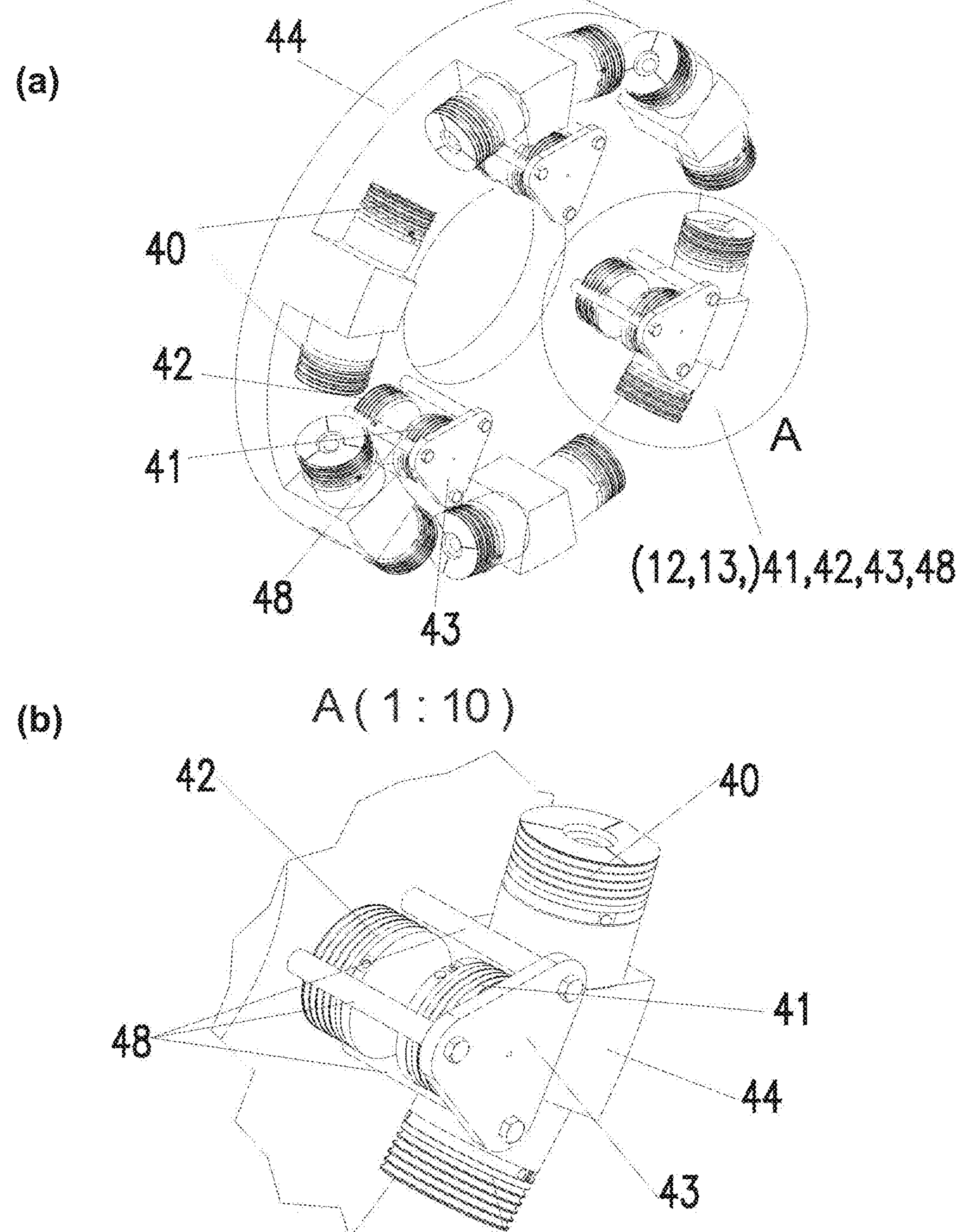
FIGS. 8(*a*)-(*b*) show a use of hydraulic springs according to the invention in a typical packet coupling of the prior art, with FIG. 8(*b*) being an enlarged view of the indicated area of detail shown in FIG. 8(*a*).

FIG. 8(*a*) shows another perspective view of a packet coupling according to the invention with a highlighted detailed view of a partial region. The arrangement corresponds to FIGS. 7(*a*)-(*c*). The output spider (45) is omitted for the sake of clarity. Likewise distributed uniformly on the circumference of a smaller radius of the coupling disks are three axially aligned pairs of hydraulic elastomer elements (41) (42), including fastening means (43) (48), arranged one above the other.

FIG. 8(*b*) shows an enlarged representation of the various differently equipped and arranged spring elements (40) (41) (42).

The invention claimed is:

1. A coupling for transmitting torques and axial forces with torsional and cardanic rigidity, the coupling comprising:

a first machine component (10) (44) designed as a disc or as a rotationally symmetrical flange, on which a force and/or torque introduced from the outside acts, and a second fixed machine component (11) (45) designed as a disk or as a rotationally symmetrical flange, to which the force and/or the torque is transmitted from the first machine component (10) (44), wherein the first and the second machine components are arranged opposite and rotationally symmetrically with respect to an imaginary common axis (9) and, by means of a plurality of spring elements (1) distributed on a circumference of the first and the second machine components, are elastically connected to one another and braced against each other, wherein the coupling, in addition to said spring elements (1) distributed on the circumference of the first and the second machine components, have two or more pairs of first hydraulic springs (12) (42) and second hydraulic springs (13) (41), wherein:

(i) the first hydraulic springs (12) (42) of each pair are arranged and functionally connected at least to the first machine component (10) (44) by connecting and clamping means (15) (48) such that the first hydraulic springs exert or transmit an axial tensile force (26) to the first machine component (10) (44) with respect to the second machine component (11) (45), and (ii) the second hydraulic springs (13) (41) of each pair are arranged and functionally connected at least to the second machine component (11) (45) by connecting and clamping means (14) (48) such that the second hydraulic springs exert or transmit an axial compressive force (25) to the first machine component (10) (44) with respect to the second machine component (11) (45), and (iii) the spring elements (1) are in the form of elastic bushings (16) which are arranged at or on the first and the second machine components (10) (11) and designed in such a way that their longitudinal axis is parallel to the common axis (9), and have a radial rigidity which is higher by at least a factor of 10 than in an axial direction.

2. The coupling according to claim 1, wherein the pairs of the first hydraulic springs (12) (42) and the second hydraulic springs (13) (41) are distributed uniformly and arranged on one and the same of the first and the second machine component (10) or (11) (45), and are braced with the first and the second machine components.

3. The coupling according to claim 1, wherein the first hydraulic springs (12) (42) and the second hydraulic springs (13) (41) of each pair are arranged one above the other on the corresponding first and the second machine component.

4. The coupling according to claim 1, wherein the first hydraulic springs (12) (42) are connected by first hydraulic lines (20) (46), and the second hydraulic springs (13) (41) are connected by second hydraulic lines (19) (47).

5. The coupling according to claim 1 wherein the bushings (16) are accommodated completely in cylindrically and/or conically shaped axial bores or depressions in one of the first and the second machine components or in both of the first and the second machine components (10) (11).

6. The coupling according to claim 5, wherein the bushings (16) are accommodated at one end in bores of one of the two disks or flanges (10) (11), and the other end is countersunk into a cylindrical or conical bore or depression (17) of the other opposite machine part (11) (10).

7. The coupling according to claim 5, wherein the bushings (16) are received at one end in bores of one of the two disks or flanges (10) (11) and are pressed and braced with the other end against a contact surface of the other opposite machine part.

8. The coupling according to claim 7, wherein the elastic bushings (16) are pressed and braced against the contact surface of the other opposite machine part via discs (30) equipped with a friction surface (31).

9. The coupling according to claim 1 wherein the first or the second hydraulic springs (12) (13) are braced with the first and the second machine components (10) or (11) via the same axial bores as the elastic bushings (16).

10. The coupling according to claim 1, wherein the machine components (10) (11) (44) (45) have a central bore or opening for receiving and/or guiding through a shaft (22) via which the axial forces are introduced.

11. A drive train for a wind turbine having a rotor shaft (22), rotor bearing (23), transmission bearing (24), transmission housing (29) and mainframe (21), wherein the drive train has a coupling according to claim 1.

12. The drive train according to claim 11, wherein the coupling is arranged in a region of the transmission bearing (24), wherein the first machine component (10) (44) is connected to the transmission housing (29), and the second machine component (11) (45) is connected to the mainframe (21).

* * * * *